2 Sheets--Sheet 1.
JOHN GIBSON, Jr.
Improvement in Bank Notes.
No. 119,599. Patented Oct. 3, 1871.
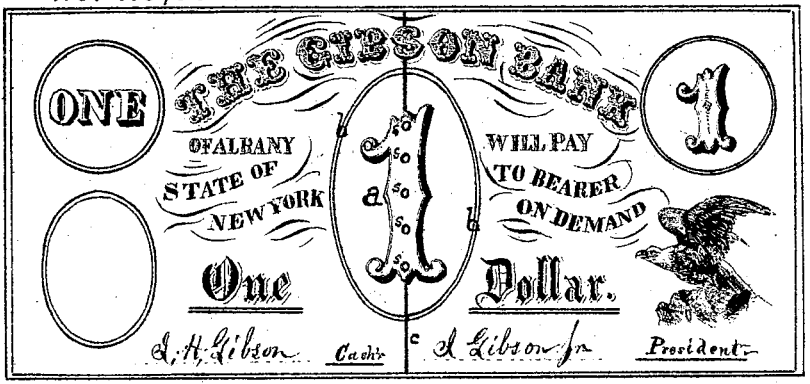
Fig 1.
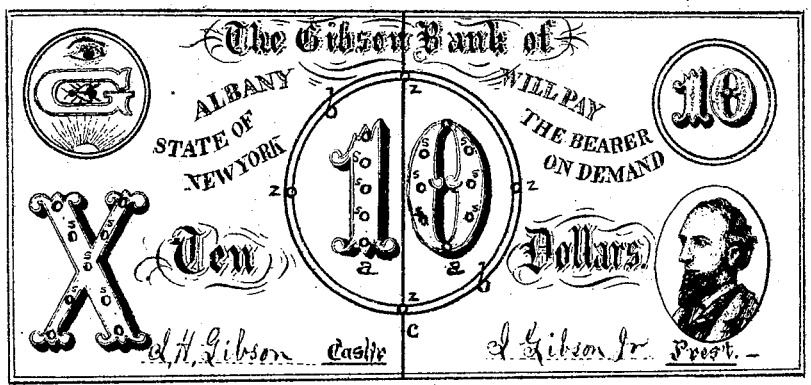
Fig 2.
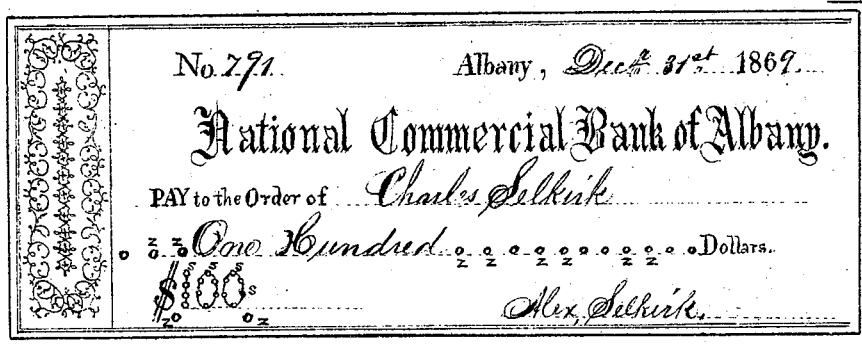
Fig 3.
Fig 4.
| $ | ¢ |
|---|---|
| 25. | 00 |
| 35. | 00 |
| 45. | 00 |
| 15. | 00 |
| 10. | 50 |
| 5. | 50 |
| 10. | 00 |
| 15. | 00 |
| 5. | 00 |
| 5. | 00 |
| 29. | 00 |
| $200. | 00 |
Witnesses:
Jno. H. Gibson
A. L. VanZandt.
John Gibson Jr
Inventor.

[32.]

JOHN GIBSON, Jr.,

Improvement in Bank Notes.

No. 119,599.    Patented Oct. 3, 1871.

Witnesses { Jno. H. Gibson, A. L. Van Zandt }    John Gibson Jr.

Inventor.

119,599

UNITED STATES PATENT OFFICE.

JOHN GIBSON, JR., OF ALBANY, NEW YORK.

IMPROVEMENT IN BANK-NOTES.

Specification forming part of Letters Patent No. 119,599, dated October 3, 1871.

*To all whom it may concern:*

Be it known that I, JOHN GIBSON, Jr., of the city and county of Albany, State of New York, have invented a new and Improved Method of Preventing Fraudulent Alterations in Bank-Notes, Checks, Bonds, and other Monetary Papers; and I do hereby declare that the following is a description thereof, reference being had to the accompanying drawing forming a part of this specification, in which—

Figure 5:
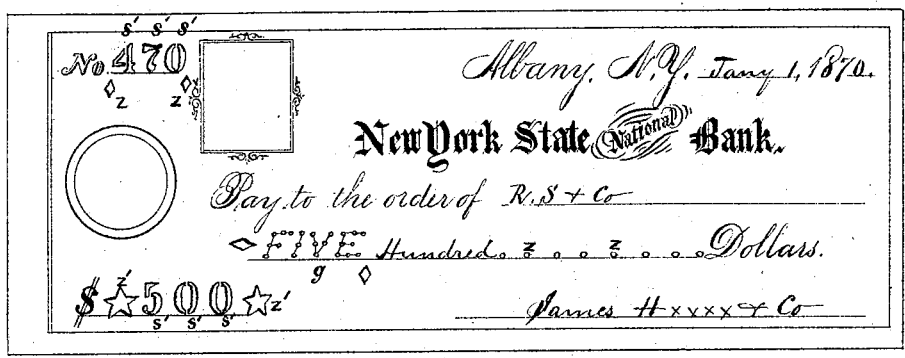
Figure 6:
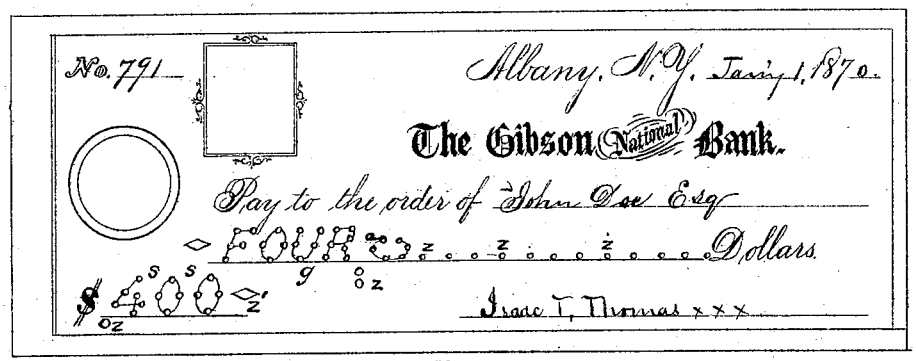
Figure 7:
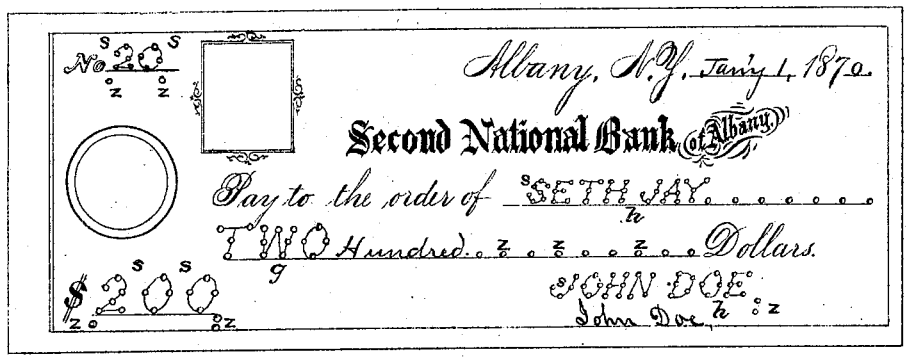

Plate I, Figure 1, represents a bank-note of small denomination, illustrating a part of my invention. Fig. 2 represents a bank-note illustrating other parts of my invention. Fig. 3 represents a bank-check, illustrating a part of my invention applied thereto. Fig. 4 represents a part of my invention as applied to a footed column of figures. Plate II, Figs. 5, 6, and 7, illustrate various features of my invention as applied to bank-checks, notes, drafts, and the like.

It is well known that bank-notes, bonds, checks, notes of hand, and the like, often have their true denominations or amounts fraudulently altered, and in bonds and the like the designating or registering-numbers are also frequently altered for fraudulent purpose, and in some cases the proper date, or the true and proper names or signatures in monetary or other papers or documents of value, such as checks, notes, deeds, bonds, book-accounts, land-warrants, &c., have been fraudulently erased, changed, or altered, as well as the amounts or registering-numbers thereof.

My invention consists in affixing indelibly and unchangeably by perforating the true and originally-expressed denomination or amount, registering-number, date, true and genuine name or signature, or other figures, letters or characters, which give authenticity or value to any paper or document, in such a manner that the said perforations will be capable of expressing the said true and original denominations, amounts, registering-numbers, dates, names, signatures, or other figures, letters, or characters; the object of the invention being to give a permanent and unchangeable expression to or in a paper or document of the true and originally-intended characteristics or essential features of the same, whereby all fraudulent alterations will be prevented or detected.

To enable others skilled in the art to make and use my invention, I will proceed to describe it in reference to the drawing and the letters of reference marked thereon, like letters indicating like or similar parts.

In the drawing, Fig. 1, Plate I, represents a bank-note of smaller denomination than ten dollars. The said note is printed from plates designed and engraved in the usual manner, in which the denomination is represented by a single figure or character, as 1, 2, 5, printed in the center of the bank-note as denomination 1, marked $a$, which figure or character $a$ I render permanent and unchangeable by the perforations $s\ s$ arranged to form the said figure or character, as shown. When the note or paper requires two or more figures or characters to express the true denomination or amount, as in Figs. 2, 3, and 4, Plate I, and Figs. 6 and 7, Plate II, I would form the said figures or characters by perforations $s\ s$ the same as the figure or character $a$ in Fig. 1, Plate I, and such figures or characters so formed can not be erased or altered. In the perforations $s\ s$ I do not confine myself to the number, size, or shape of the same, to be used in any given case to form such figures or characters, as the said perforations may be round or square or of other form, as $s'\ s'$, in Fig. 5, Plate II, any of which would answer the purpose intended. In bonds, land-warrants, or other papers or documents having designating or registering-numbers represented by figures or other characters, I would form the said figures or other characters by the said perforations $s\ s$, as the No. 20 in Fig. 7, Plate II, or by perforations $s'\ s'$, as in No. 470, Fig. 5, Plate II, substantially in the same manner as the perforated figures or characters representing the denomination or amount, as before described. In notes, checks, drafts, or other similar negotiable papers which have heretofore been liable to fraudulent erasure or alteration of the original true amount, date or names, I would use the same method of perforations $s\ s$ or $s'\ s'$, substantially as before described, to form the worded amounts, as $g$ in Figs. 5, 6, and 7, Plate II, or name, as $h$ in Fig. 7, Plate II. By perforating the said worded amounts, as described, a permanent corroboration of the amount expressed by figures is had, and by perforating the names of interested parties and the like, the said names will be unalterably fixed, and any attempt at alteration of the same may be readily detected. In my invention to prevent the addition of fraudulent matter, either in denomination, amount, registering-number, or other original and true characteristics of the paper to be protected, whether it be with the perforated characters or figures, or with the written or printed expressions of denomination, amount, registering-number, or other matter, I make use of other additional perforations, $z\ z$, which I denominate blocking or limiting perforations, shown in the several figures. The said blocking perforations $z\ z$ may be of any size, form, or number, as desired, as shown variously in the several figures of Plate I and Plate II. The said blocking perforations $z\ z$ may be used in several ways—for instance, when used to "block" figures or characters representing denomination, amount, registering-number, and the like, I would place the said perforations $z\ z$ (one or more in number) out of line with the perforations $s\ s$, forming such figures or characters, and at one or both ends of the same, as shown in Fig. 3, Plate I, and in Figs. 6 and 7, Plate II; or, when the blocking perforations are made of such size and shape as that they can not be formed into additional figures or characters, as perforations $z'\ z'$, Figs. 5 and 6, Plate II, they may in such cases be placed in range with the said perforated figures or characters, as shown. Or, again, when the blocking perforations $z\ z$ are to be used to "stop out" the unused portion of a written or printed line, or any number of lines or unused space, they may range with such lines, or may be run oblique with such lines or spaces, where heretofore scoring or stopping out with ink-lines only has been customary in bank-checks, notes, legal instruments, and the like, and which ink-lines were liable to erasure and might thus allow the insertion of additional fraudulent matter.

This invention is simple and effectual to prevent or detect any fraudulent alteration of the essential matter forming a part of any note, check, bond, land-warrant, deed, balance-sheet, or footing of account, or any other monetary paper or document of value, and can with advantage be applied to auditing bills, claims, and the like, against corporations, or in municipal or government business; and all the perforations, as described, may be readily made by suitable tools or instruments adapted to form either one or several perforations at a time, as circumstances may demand. In negotiable paper or papers liable to be much handled, I would prefer the style of perforation as shown in the several figures in Plate I, and in Figs. 6 and 7, Plate II; but when the papers or documents are to lay "in file," or are liable to but little handling, as deeds, bonds, audited accounts, &c., preference may be given to the style of perforation $s'\ s'$, as shown in Fig. 5, Plate II.

The advantage of my mode of preventing fraudulent alterations or additions in papers or documents of value over other methods heretofore used is, that the perforations can not be restored or obliterated; nor are they liable to mechanical or chemical manipulation for fraudulent purpose without detection.

Having described my invention, what I claim, and desire to secure by Letters Patent, is—

1. In bank-notes, checks, bonds, and other monetary papers or documents of value, the arrangement of perforations $s\ s$ or $s'\ s'$ to form or constitute figures or characters expressing the true denomination, amount, number, date, name, or other essential matter, whereby such perforated figures or characters are rendered indelible, ineffaceable, or unchangeable, substantially as and for the purpose set forth.

2. The arrangement of figures or characters formed by perforations made in the paper, constituting a note, check, bond, or other instrument or document, with the written or printed essential features or characteristics of such note, check, bond, &c., whereby a correspondence and corroboration of the true and originally-intended expressions will be had in the same in an unalterable manner, for the purpose substantially as set forth.

3. The arrangement of the blocking or limiting perforations $z\ z$ or $z'\ z'$ with the figures or characters expressing the original and true denomination, amount, registering-number, date, name, or other essential characteristics of a note, check, bond, or other instrument or document, whereby the fraudulent insertion of additional figures, letters, or other characters or matter, will be effectually prevented or detected, substantially as set forth, and for the purpose specified.

JOHN GIBSON, JR.

Witnesses:
JNO. H. GIBSON,
A. L. VAN ZANDT.